United States Patent [19]
Nix

[11] Patent Number: 5,828,212
[45] Date of Patent: Oct. 27, 1998

[54] APPARATUS FOR DETERMINING THE THICKNESS OF A LAYER OF PAINT ON A SUBSTRATE

[75] Inventor: Norbert Nix, Köln, Germany

[73] Assignees: Automation Hans Nix KG; Fabrik f. ind. Erzeugnisse & Co., both of Cologne, Germany

[21] Appl. No.: 622,833

[22] Filed: Mar. 27, 1996

[30] Foreign Application Priority Data

Mar. 28, 1995 [DE] Germany ............... 195 11 397.7

[51] Int. Cl.⁶ ............... G01B 7/06; G01R 33/12; G01N 27/72
[52] U.S. Cl. ............... 324/230; 324/225
[58] Field of Search ............... 324/229, 230, 324/231, 225

[56] References Cited

U.S. PATENT DOCUMENTS

| 4,881,031 | 11/1989 | Pfisterer et al. | 324/230 |
| 5,343,146 | 8/1994 | Koch et al. | 324/230 |

FOREIGN PATENT DOCUMENTS

| 2108672 | 5/1983 | United Kingdom | 324/230 |

*Primary Examiner*—Walter E. Snow
*Attorney, Agent, or Firm*—Nikaido, Marmelstein, Murray & Oram LLP

[57] ABSTRACT

An apparatus for determining paint damage including a magnetic-field responsive sensor and display elements. The sensor signal function of the thickness of the paint on a substrate is fed by a discriminator to one of at least two tracks in relation to the amplitude of said signal. A display element is assigned to each track and in the presence of a signal will display said track.

12 Claims, 3 Drawing Sheets

APPARATUS FOR DETERMINING THE THICKNESS OF A LAYER OF PAINT ON A SUBSTRATE

BACKGROUND OF THE INVENTION

The present invention concerns paint-damage determining apparatus comprising a magnetic-field responsive sensor and display elements.

Desirably when buying a used car, one ought to be able to ascertain if this car was in an accident. In general this problem cannot be solved, or only with difficulty, by the lay person, because body work and paint jobs may give the impression of the accident-free state. Even new cars may be subject to accidents during production or shipment of the car from the factory to the user usually over large distances. In such cases repeat painting is carried out on the car which frequently is sold as new to unaware customer. Therefore it is desirable also to check even new cars for repair work.

The lay person however encounters substantial difficulties in ascertaining whether a vehicle, and in particular an automobile, has suffered an accident, repair work frequently escaping detection by the naked eye and because following repair and repainting, the vehicle looks very similar to an accident-free original vehicle.

Consequently automotive manufacturers and experts use thickness gauges able to measure the vehicle paint thickness to an accuracy of microns ($\mu$), for instance in the manner of the European patent application 0,576,714. The condition of the paint layer can be analyzed by such coating thickness gauges, that is, they allow determine the presence of the original paint or of a second paint job, or whether repair painting together with filling was carried out. Such improvements most of the time are carried out only over some areas and substantially increase the thickness of the layer on the vehicle sheetmetal. Illustratively if troweling or filling material was used, then a substantially thicker layer is present at such locations on the sheetmetal than in the original condition. Again when depositing a second paint on the earlier one, the total layer thickness on the vehicle sheetmetal will be substantially larger than originally.

Such layer-thickness gauges incur the substantial drawback of complex technical operation, and hence preclude simple handling by the lay person.

Moreover these thickness gauges are comparatively expensive and as a result they are bought mostly by experts because it is uneconomical for a vehicle buyer to purchase a fairly expensive gauges only to ascertain the presence of repairs, if any.

A further and substantial drawback of said thickness gauges is their high resolution and accuracy when sensing paint thickness: the very accurate paint thickness indicated by said gauges in $\mu$m is more confusing than helpful to the lay person when merely wishing to ascertain repairs or improvements, that is, whether there was damage to the paint.

SUMMARY AND OBJECT OF THE INVENTION

The object of the present invention is create apparatus determining paint damage which is free of the above drawbacks. It relates in particular to apparatus of very simple design which is operable without lengthy familiarization. Moreover it is compact and easily handled as well as economical.

This problem is solved by an apparatus for determining paint damage using a magnetic-field responsive sensor and display elements, further comprising a discriminator which feeds the signal from the sensor related to the thickness of the paint layer present on a substrate to at least one of two tracks as a function of signal magnitude with one display element assigned to each track, that element displaying the signal when on its track.

The sub-claims are appropriate embodiments of the invention.

The advantages of the invention are based on the following operation: a magnetic-field responsive sensor generates a signal depending on the thickness of a coating on a substrate. In relation to its magnitude this signal is assigned by a discriminator to one or more tracks fitted with display elements whereby the user can determine which track corresponds to the signal. Accordingly only a few states, preferably merely two or three, are displayed to the user of the apparatus so designed. These states indicating the thickness range within which is located the paint layer and it being known that the thickness of a normal layer typically is within 80 and 140 $\mu$m (3–5 mil) approximately, then ascertaining the particular track allows determining whether the original paint is involved or not. Moreover it is known that paint thickness of 180 to 250 $\mu$m (7–10 mil) is presumption of double painting. Repair painting with grinding and filling comprises sites at which the thickness exceeds 250 $\mu$m (10 mil). Therefore the measured thickness leads to conclusions about the state of the painting, in other words, a determination can be made whether the original paint is still in place or whether changes, such as double painting or filling work have been carried out, implying improvements and hence accident. The said tracks each can be associated with these ranges of thickness.

Only inference being required that repairs were carried out or not, it suffices to display that of the above tracks associated most closely with the measured paint thickness. Thus the user is informed of the existence of an accident without being confused by a precise statement of the paint thickness.

A further advantage of such apparatus with only a few display states is the freedom from high accuracy of measurement reaching into the $\mu$ range, whereby costly and time-consuming adjustments are superfluous.

In one preferred embodiment of the invention this apparatus is fitted with temperature compensation so that layer-thickness measurement will be temperature-insensitive.

In another preferred embodiment of the present invention the signal from the sensor is fed to an amplifier before it reaches the discriminator.

In an especially preferred embodiment of the invention, the division of the range of values of the sensor output signal into the various tracks is implemented by the discriminator using comparators. This feature takes into account that the sensor signal in general is strongly non-linear relative to the layer thickness.

In another preferred embodiment the discriminator distinguishes only between two cases, "accident" or "no-accident", and therefore only two tracks and hence only two display elements are needed.

Should such a coarse distinction be insufficient, then an alternate preferred embodiment the discriminator will distinguish between three states, namely "accident", "not-sure" and "accident-free". Regarding paint thicknesses in the boundary zones and therefore tainted with doubt as to the paint state being the original one, i.e., when "not sure" is indicated, further testing must be carried out.

The sensors are conventional, namely hall generators, magnetoresistive plates, eddy-current pickups, induction pickups etc.

The particular activated track is displayed by light sources, for instance light-emitting diodes (LEDs) or electric bulbs appropriately of different colors to facilitate recognition of the particular displayed state.

In another preferred embodiment of the invention, spacers are mounted in the vicinity of the sensor in order to ensure accurate sensor-element positioning relative to the test site. The sensor is appropriately supported in resilient manner to ensure accurate measuring position even on irregular surfaces.

BRIEF DESCRIPTION OF THE DRAWINGS

The invention is elucidated below in detail in relation to a preferred embodiment and to the attached drawings.

DETAILED DESCRIPTION OF PREFERRED EMBODIMENTS

Figure 1:
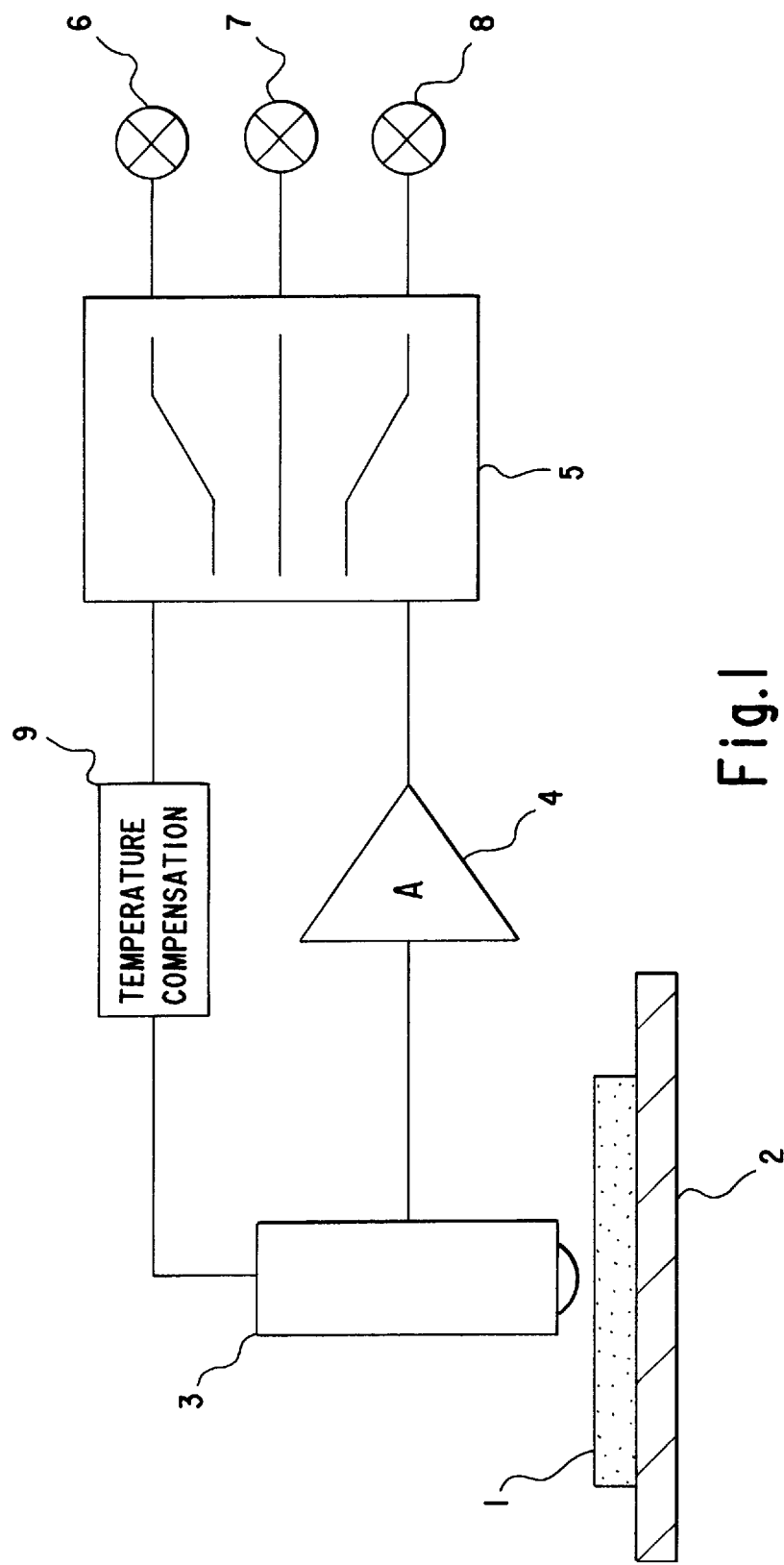
FIG. 1 shows a circuit of apparatus of the invention to determine paint damage.
Figure 2:
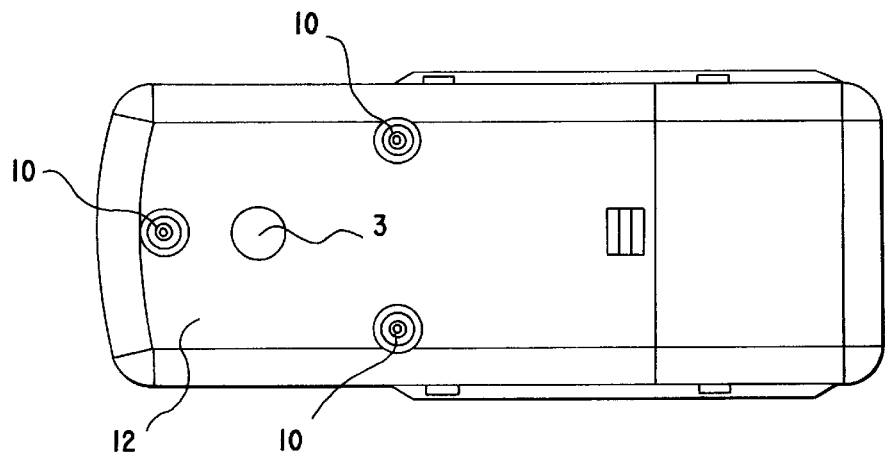
FIG. 2 is a view of the underside of this apparatus.
Figure 3:
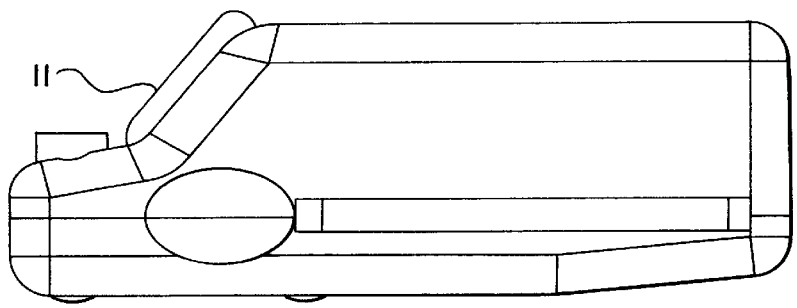
FIG. 3 is a side view of this apparatus.
Figure 5:
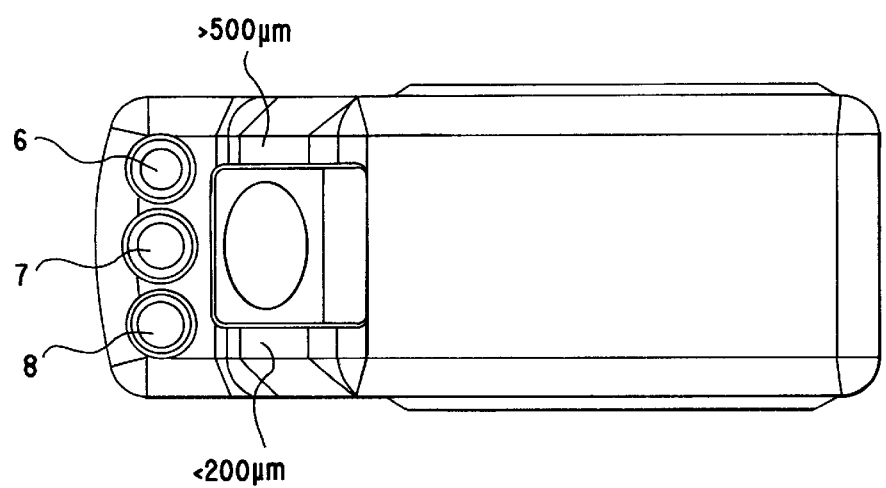
FIG. 5 is a top view of this apparatus.
Figure 4:
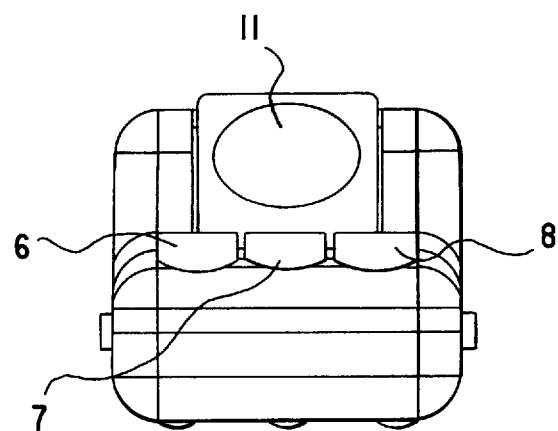
FIG. 4 is a front view of this apparatus.

A layer of paint 1 is present on a schematically shown portion of 2 sheetmetal of a vehicle body. A magnetic-field responsive sensor 3 is placed at a test site on the paint layer 1. The output signal from the sensor 3 is fed to an amplifier 4. The amplified signal is associated in a subsequent discriminator 5 to one of three tracks or channels. The purpose of the discriminator 5 is to assign to each track a specified range of thicknesses, for instance 0 to 150 μm (0–6 mil), 150 to 250 μm (6–10 mil) and >250 μm (10 mil). The output voltage from the magnetic-field responsive sensor 3 varying in strongly non-linear manner with the thickness of the layer of paint 1 on the sheetmetal 2, the tracks of the discriminator 5 are matched to this non-linear behavior. For that purpose each track comprises a comparator of which the threshold value is set once and for all, as a result of which the particular thickness range of layer of paint 1 can be assigned to a corresponding track. If now this track threshold is crossed upward or downward by the output signal from the sensor 3, then the corresponding comparator will turn the pertinent track ON or OFF respectively. Thereupon another track is deactivated or activated respectively. The particular activated track is optically displayed by display elements 6, 7, 8 of different colors. In this manner the range into which falls the thickness of the paint layer 1 measured by the sensor 3 may be ascertained.

It is known that the thickness of a normal layer of paint is between 80 and 140 μm (3–5 mil) approximately. It is also known that for a thickness of the paint layer between 180 and 250 μm (7–10 mil) there is presumption of a second paint job. If repair painting was carried out with grinding and filling, then the layer of paint at some sites will evince thicknesses larger than 250 μm (10 mil). If each track was assigned a thickness range in the manner described above, then the state of the layer of paint can be inferred from the particular active display element. For instance the green element will light up for a problem-free layer of paint, the red one for damaged paint and in case of doubt the yellow element.

The magnetic-field responsive sensor 3 may be in the form of a magnetoresistive plate or a hall generator and may be operated in conjunction with a permanent magnet (not shown); alternatively the sensor 3 may also operate magnetically or magnetically-inductively.

The above sensors are susceptible to temperature effects. To eliminate such effects, an appropriate temperature-compensation circuit 9 is used. The temperature of sensor 3 is measured by a temperature pickup and then the temperature drift of sensor 3 is compensated by the compensating circuit 9.

Illustratively the temperature of sensor 3 can be found by measuring the temperature-dependent internal resistance of said sensor, and this temperature may be taken into account while ascertaining the test results.

Spacers 10 are mounted on the outside of the apparatus housing 12 around the magnetic-field responsive sensor 3 in order that, when the apparatus is placed on a test site, said sensor 3 shall be at a defined position relative to the paint layer 1. The sensor 3 is elastically supported in the apparatus and projects beyond that side of the apparatus which during the test of the paint layer 1 is facing said layer.

A switch 11 is mounted at the topside of the apparatus and after placing the apparatus on the test site must be actuated in order to perform the test.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. Apparatus for determining the thickness of a layer of paint on a substrate, said apparatus comprising magnetic field responsive sensor means for sensing the thickness of the layer of paint on the substrate; a plurality of display elements; discriminator means coupled to the sensor means and the display elements, for applying a signal to a predetermined one of the display elements as a function of the thickness of the paint layer sensed by the sensor means, measuring means for measuring the temperature dependent internal resistance of said sensor means, and temperature compensation means connected to said measuring means and the discriminator means for compensating for temperature drift of the sensor means; wherein each of the display elements corresponds to a predetermined range of paint layer thickness.

2. Apparatus for determining the thickness of a paint layer as set forth in claim 1, further comprising an amplifier connected between said sensor means and said discriminator means for amplifying the output signal from the sensor means.

3. Apparatus for determining the thickness of a paint layer as set forth in claim 1, wherein said discriminator means comprises a plurality of comparators for selecting the predetermined one of the display elements.

4. Apparatus for determining the thickness of a paint layer as set forth in claim 3, wherein comparator threshold-values are separated in such manner that the signal from the sensor means is applied to only one display element.

5. Apparatus for determining the thickness of a paint layer as set forth in claim 1, wherein said discriminator means has two tracks, and wherein the display elements display only "paint-damage" or "no paint-damage".

6. Apparatus for determining the thickness of a paint layer as set forth in claim 1, wherein said discriminator means has three tracks, and wherein the display elements display "paint-damage", "uncertain", or "no paint-damage".

7. Apparatus for determining the thickness of a paint layer as set forth in claim 1, wherein said sensor means is one of a hall generator or a magnetoresistive plate.

8. Apparatus for determining the thickness of a paint layer as set forth in claim 7, further comprising a permanent magnet mounted in the vicinity of the sensor means.

9. Apparatus for determining the thickness of a paint layer as set forth in claim 1, wherein the display elements are one of LEDs or electric bulbs.

10. Apparatus for determining the thickness of a paint layer as set forth in claim 1, wherein each display element displays a different color.

11. Apparatus for determining the thickness of a paint layer as set forth in claim 1, further comprising a housing for housing the apparatus and spacers mounted outside the housing in the vicinity of the sensor means.

12. Apparatus for determining the thickness of a paint layer as set forth in claim 3, further comprising a housing, and wherein the sensor means are elastically supported within the housing.

* * * * *

UNITED STATES PATENT AND TRADEMARK OFFICE
CERTIFICATE OF CORRECTION

PATENT NO. : 5,828,212

DATED : October 27, 1998

INVENTOR(S) : Nix

It is certified that error appears in the above-identified patent and that said Letters Patent is hereby corrected as shown below:

```
On the title page,
    Item [54], delete "APPARATUS FOR DETERMINING THE THICKNESS OF A LAYER OF PAINT ON A SUBSTRATE" insert therefor -- AN

APPARATUS FOR DETERMINING THE THICKNESS OF PAINT ON A

SUBSTRATE --

Item [73], line 3, delete "Cologne" insert therefor

-- Köln --
```

Signed and Sealed this

Second Day of March, 1999

Attest:

Q. TODD DICKINSON

*Attesting Officer*   *Acting Commissioner of Patents and Trademarks*